United States Patent
Lai

(10) Patent No.: US 9,032,601 B2
(45) Date of Patent: May 19, 2015

(54) ASSEMBLY TOOL FOR ASSEMBLING LENS MODULES

(75) Inventor: Chien-Nan Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 402 days.

(21) Appl. No.: 13/449,286

(22) Filed: Apr. 17, 2012

(65) Prior Publication Data
US 2013/0133186 A1    May 30, 2013

(30) Foreign Application Priority Data
Nov. 28, 2011    (TW) .................................. 100143513

(51) Int. Cl.
    *B25B 27/14*    (2006.01)
    *B23P 19/04*    (2006.01)
(52) U.S. Cl.
    CPC ...................................... *B23P 19/04* (2013.01)
(58) Field of Classification Search
    CPC .................................................... B23P 19/04
    USPC ......... 29/739, 740, 281.1, 270, 271; 269/240, 269/249; 81/3.31
    See application file for complete search history.

(56) References Cited

U.S. PATENT DOCUMENTS

| | | | |
|---|---|---|---|
| 6,393,947 B1* | 5/2002 | Corcoran et al. | 81/3.31 |
| 2009/0129412 A1* | 5/2009 | Kim | 372/6 |
| 2013/0086802 A1* | 4/2013 | Wang | 29/721 |
| 2014/0013560 A1* | 1/2014 | Wang | 29/281.1 |

\* cited by examiner

*Primary Examiner* — Lee D Wilson
*Assistant Examiner* — Jamal Daniel
(74) *Attorney, Agent, or Firm* — Novak Druce Connolly Bove + Quigg LLP

(57) ABSTRACT

An assembly tool for assembling a lens tube in a support frame includes a main body and a top cover rotatably connected to the main body. The top cover includes a positioning plate and a fastening assembly rotatably connected to the positioning plate. The fastening assembly includes a fastening member and a restricting member connected to the fastening member, and the fastening member is threaded with the positioning plate. The support frame is positioned on the main body, and the lens tube is positioned on the support frame. The restricting member is capable of engaging with the lens tube, and thus the lens tube is rotated into the support frame by rotating the fastening member.

13 Claims, 5 Drawing Sheets

ASSEMBLY TOOL FOR ASSEMBLING LENS MODULES

BACKGROUND

1. Technical Field

The present disclosure generally relates to assembly tools, and particularly to an assembly tool for assembling a lens module.

2. Description of the Related Art

In assembly of an optical lens for a mobile phone, a group of lenses is inserted into a lens tube, and an infra-red (IR) filter is attached to the lens tube. After that, glue is dispensed between the IR filter and the lens tube. The lens tube is fixed in an assembly base, and the optical lens has been assembled. However, an operator generally positions the lens tube in the assembly base manually, therefore, the optical lens is easily scratched and contaminated. Furthermore, it is difficult for the operator to precisely control a height of the optical lens formed by the lens tube and the assembly base, resulting in bad imaging effect of the optical lens.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
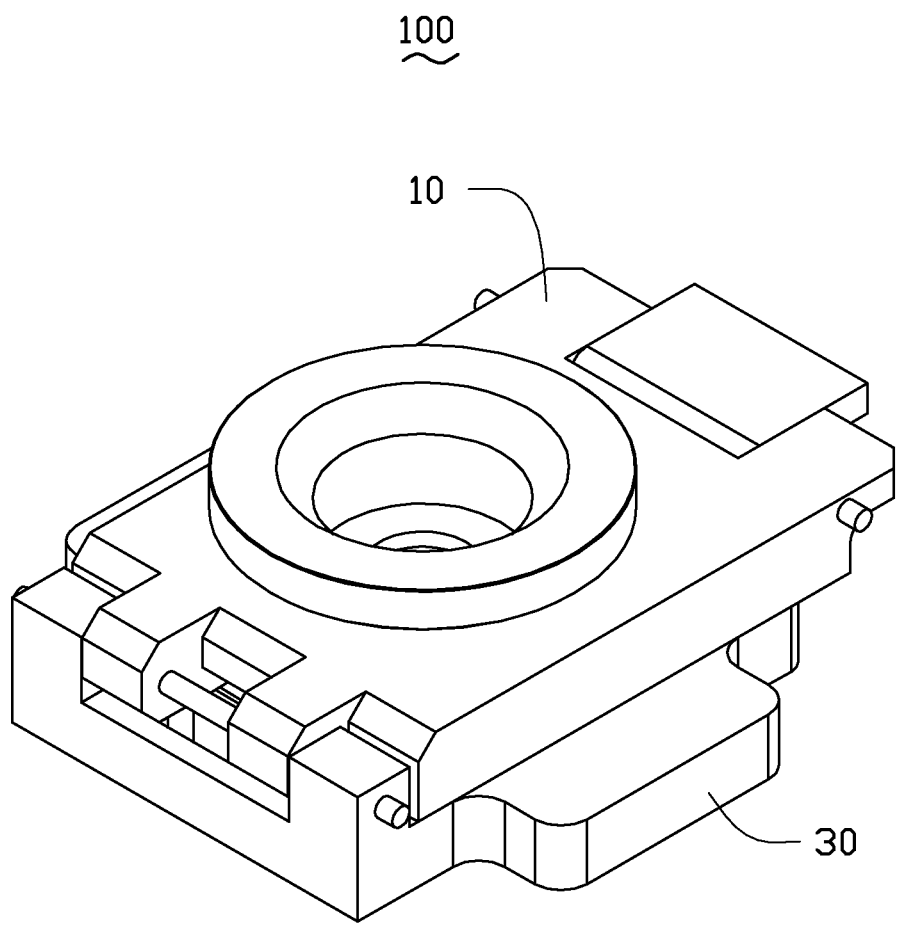
FIG. 1 is an assembled, isometric view of an embodiment of an assembly tool for assembling a lens module.
Figure 2:
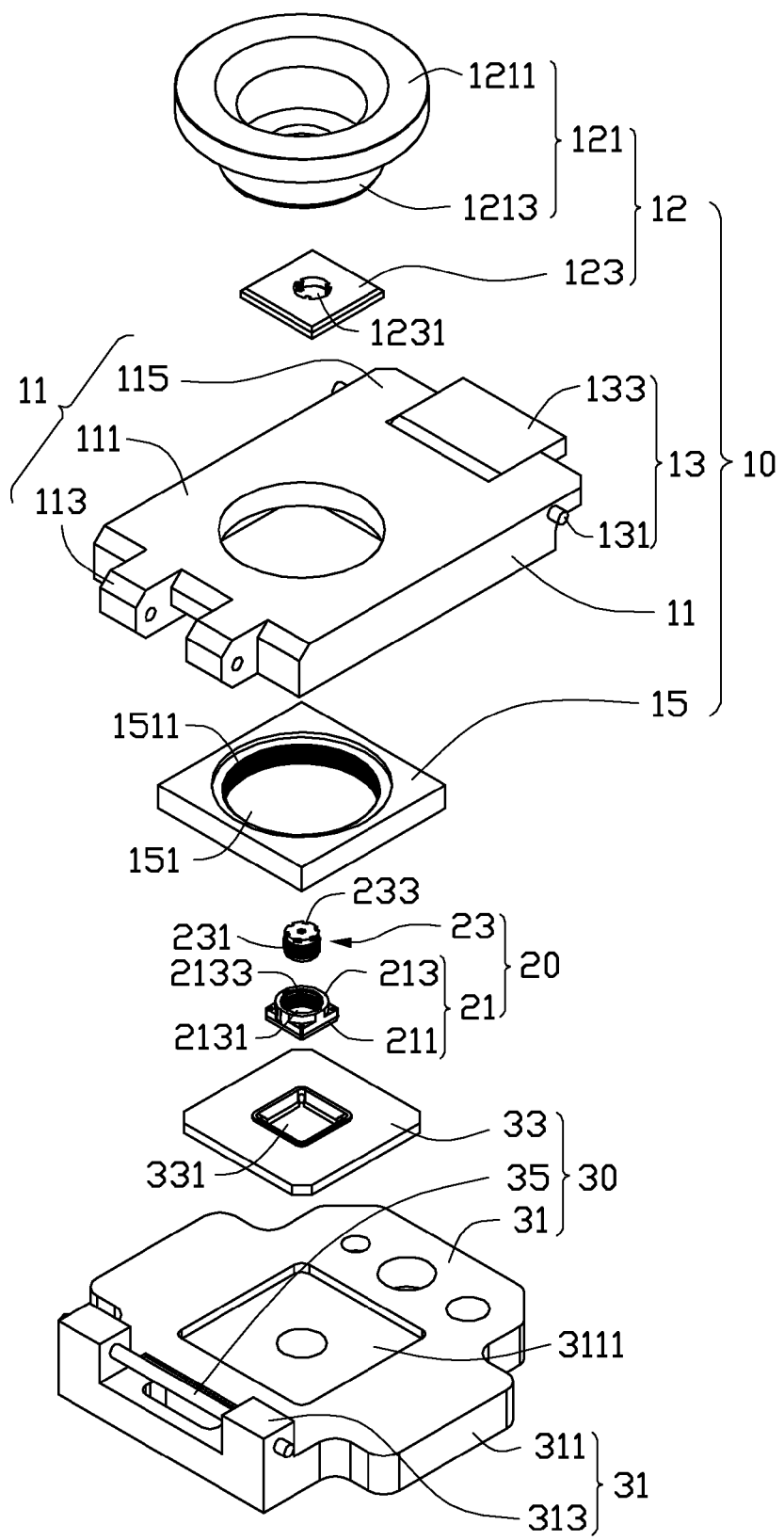
FIG. 2 is an exploded, isometric view of the assembly tool and the lens module of FIG. 1.

FIGS. 1 and 2, show an embodiment of an assembly tool 100 for assembling a lens module 20. The assembly tool 100 includes a main body 30 and a top cover 10 rotatably connected to the main body 30.

Figure 3:
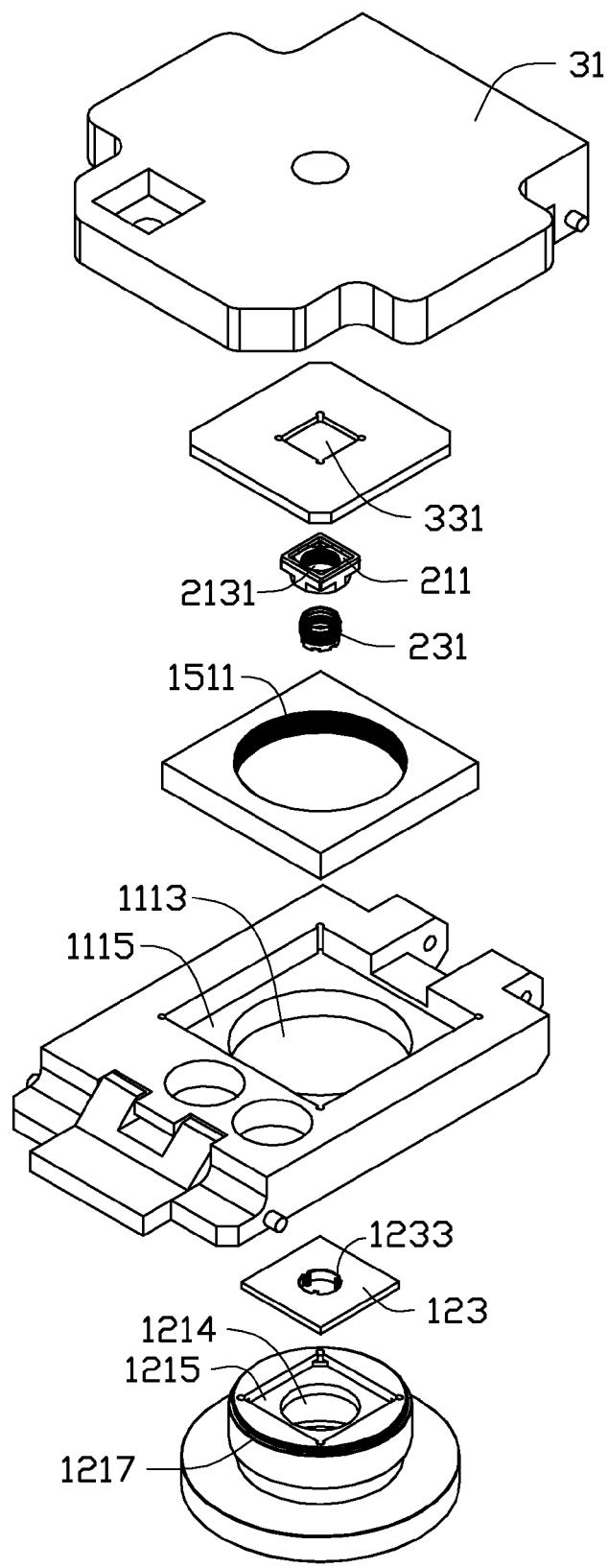
FIG. 3 is similar to FIG. 2, but viewed from another aspect.

FIGS. 2 and 3, show the top cover 10 includes a cover body 11, a fastening assembly 12, a rotary assembly 13, and a positioning plate 15. The fastening assembly 12, the rotary assembly 13, and the positioning plate 15 are positioned to the cover body 11. The cover body 11 includes an assembly plate 111, a connecting portion 113, and a rotary portion 115. The connecting portion 113 and the rotary portion 115 are formed on opposite sides of the assembly plate 111. The assembly plate 111 is substantially rectangular, and defines an assembly hole 1113 in a center for receiving the fastening assembly 12. A bottom surface of the assembly plate 111 defines a receiving groove 1115 communicating with the assembly hole 1113. The positioning plate 15 is received in the receiving groove 1115. The connecting portion 113 is rotatably connected to the main body 30, and the rotary portion 115 is connected to the rotary assembly 13.

The fastening assembly 12 is positioned in the assembly hole 1113 of the assembly plate 111. The fastening assembly 12 includes a fastening member 121 and a restricting member 123. The fastening member 121 includes a main portion 1211 and a fastening head 1213 extending from an end of the main portion 1211. The fastening head 1213 defines a restricting groove 1215 at one end away from the main portion 1211. The fastening head 1213 forms a first threaded portion 1217 for engaging with the positioning plate 15. The restricting member 123 is positioned in the restricting groove 1215 of the fastening head 1213, and defines a penetrating hole 1231 in a center portion. A plurality of engaging portions 1233 are formed on a side wall defining the penetrating hole 1231. The engaging portions 1233 are engaged with the lens module 20.

The rotary assembly 13 includes a rotating shaft 131 and a rotating plate 133. The rotating plate 133 is rotatably connected to the cover body 11 via the rotating shaft 131. The positioning plate 15 is positioned in the receiving groove 1115. The positioning plate 15 defines a connecting hole 151 coaxial with the assembly hole 1113 in a center portion. A second threaded portion 1511 is formed on the inner surface of the connecting hole 151 to engage with the first threaded portion 1217.

The main body 30 includes a support member 31, an assembly plate 33, and a pivot shaft 35. The support member 31 includes a main portion 311 and a pivot portion 313 formed on a side of the main portion 311. The main portion 311 defines a receiving groove 3111 for receiving the assembly plate 33. The pivot portion 313 is rotatably connected to the connecting portion 113 via the pivot shaft 35. The assembly plate 33 defines a restricting hole 331 for receiving the lens module 20.

Figure 4:
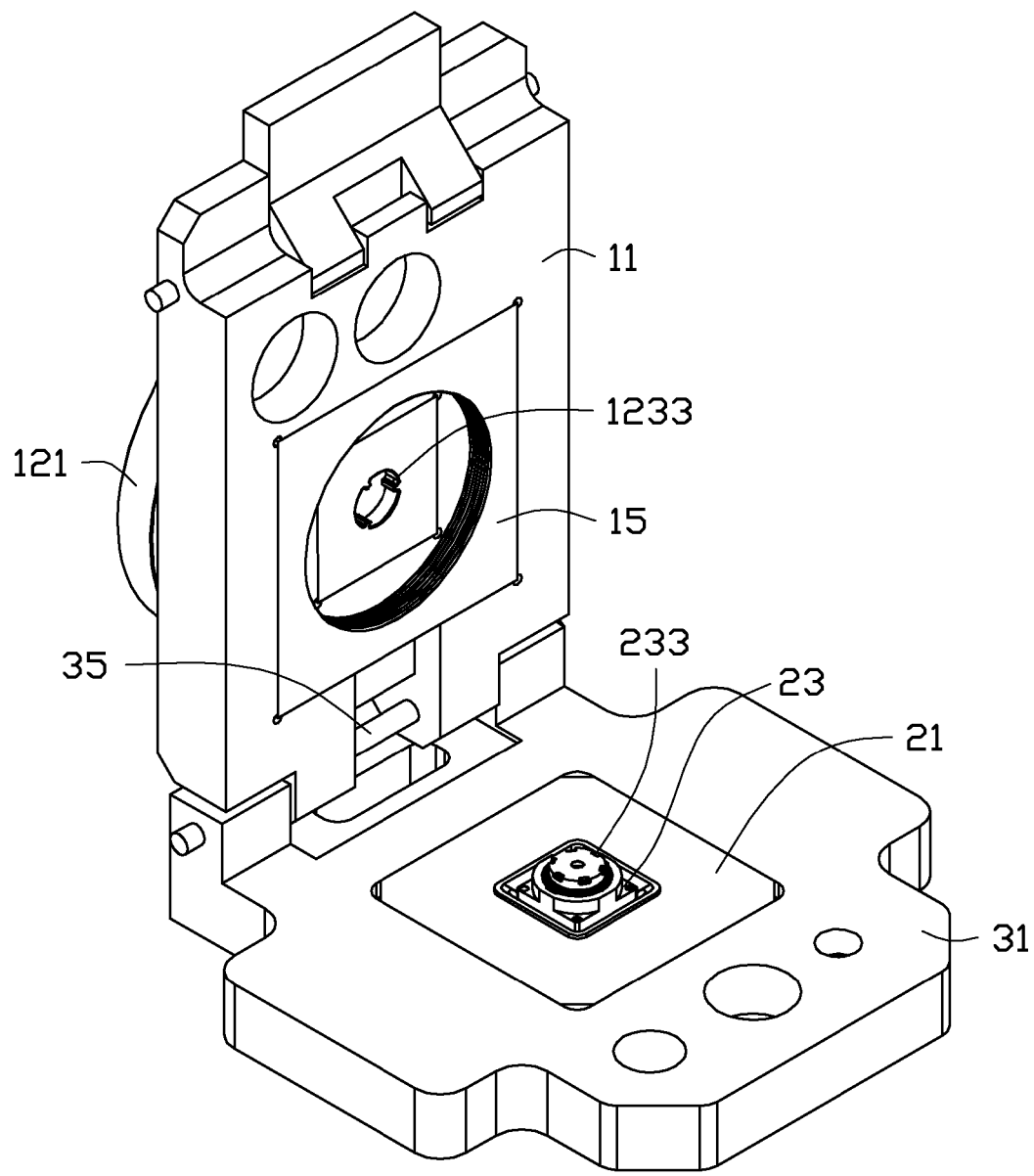
FIG. 4 is an isometric view of the assembly tool and the lens module of FIG. 1 with the assembly tool in an open state.
Figure 5:
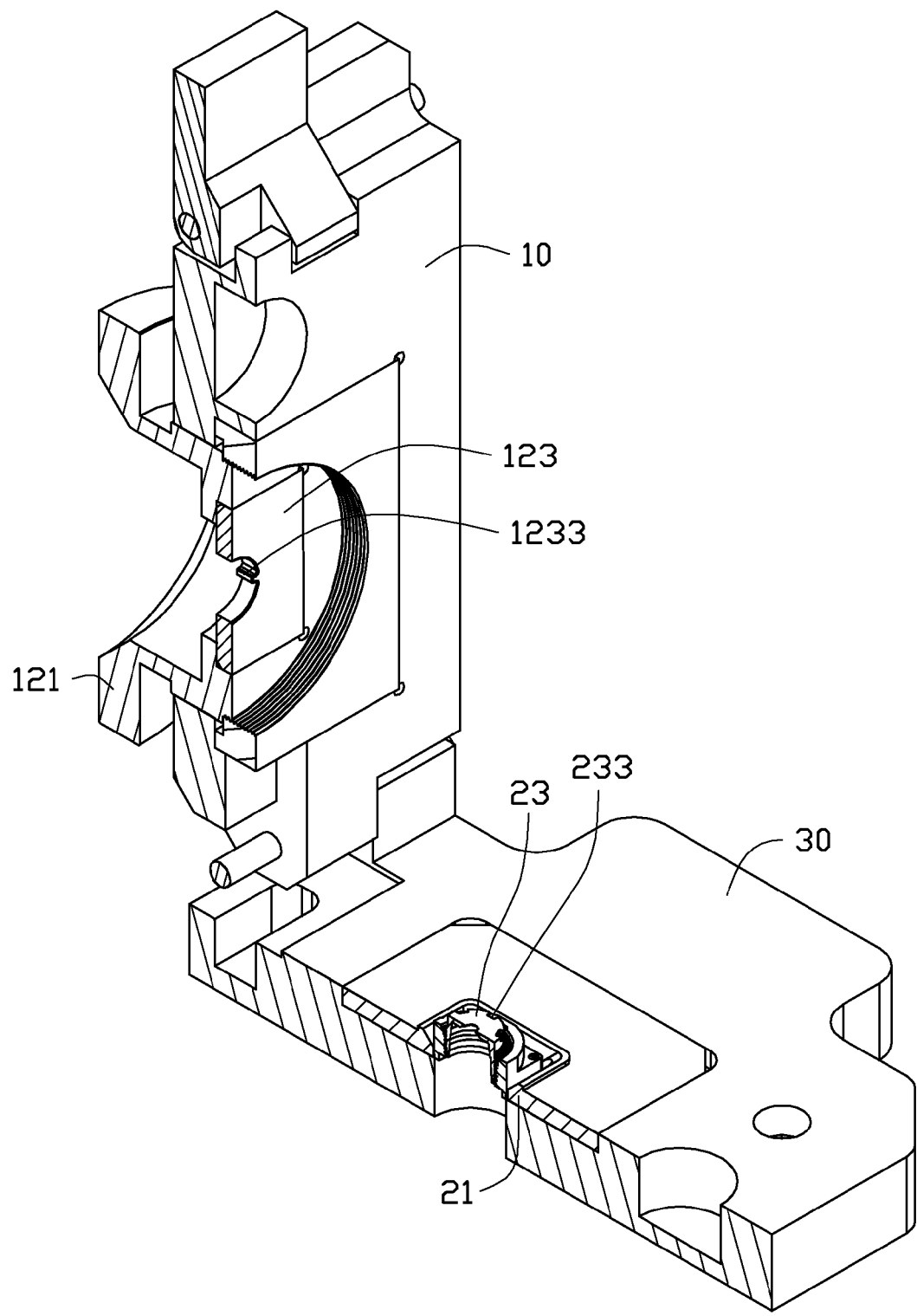
FIG. 5 is similar to FIG. 4, but showing a cut-away view of the assembly tool and the lens module.

Referring also to FIGS. 4 and 5, the lens module 20 includes a support frame 21 and a lens tube 23 positioned on the support frame 21. The support frame 21 includes a support plate 211 and a receiving portion 213 formed on the support plate 211. The support frame 21 defines a positioning hole 2131 penetrating through the receiving portion 213 and the support plate 211. A third threaded portion 2133 is formed in the inner surface of the positioning hole 2131. The lens tube 23 is substantially cylindrical, and forms a fourth threaded portion 231 on a side surface. The lens tube 23 further defines a plurality of connecting grooves 233 in an end surface for receiving the engaging portions 1233.

In assembly of the assembly tool 100, the rotating plate 133 is rotatably connected to the cover body 11 via the rotating shaft 131. The positioning plate 15 is positioned in the receiving groove 1115 of the cover body 11. The assembly plate 33 is positioned in the receiving groove 3111 of the support member 31. The top cover 10 is rotatably connected to the main body 30 via the pivot shaft 35. The fastening member 121 is positioned in the assembly hole 1113 of the cover body 11, and engaged with the positioning plate 15.

In use, the top cover 10 is rotated away from the main body 30. The support frame 21 is positioned in the restricting hole 331 of the assembly plate 33. The lens tube 23 is positioned on the support frame 21. Then, the top cover 10 rotates towards the main body 30 until the top cover 10 positioned on the main body 30. The lens tube 23 is engaged in the penetrating hole 1231 of the restricting member 123, with the engaging portions 1233 is received in the connecting grooves 233. The fastening member 121 is rotated to make the first threaded portion 1217 of the fastening member 121 move towards the main body 30 along the second threaded portion 1511, resulting in the fourth threaded portion 231 of the lens tube 23 moving downwards along the third threaded portion 2133 of the support frame 21. After the lens tube 23 is entirely engaged in the support frame 21 to form the lens module 20, the top cover 10 is rotated away from the main body 30 again, and the lens module 20 is taken out of the main body 30.

Because the restricting member 123 is restricted in the restricting groove 1215 of the fastening member 121, and the lens tube 23 is engaged with the restricting member 123, therefore, the lens tube 23 can rotate together with the fastening member 121. As a result, when the fastening member 121 rotates relative to the positioning plate 15, the lens tube 23 is then rotated relative to the support frame 21. Accordingly, the lens tube 23 can be successfully embedded in the support frame 21 driven by the fastening member 121, and there is no need to directly rotate the lens tube 23 by hand.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An assembly tool for assembling a lens tube in a support frame, comprising:
    a main body configured for positioning the support frame; and
    a top cover rotatably connected to the main body, wherein the top cover comprises a positioning plate and a fastening assembly rotatably connected to the positioning plate; the fastening assembly comprises a fastening member and a restricting member connected to the fastening member, the fastening member is threaded with the positioning plate, and the restricting member defines a penetrating hole for receiving the lens tube and comprises a plurality of engaging portions on a side wall defining the penetrating hole, and the plurality of engaging portions are configured for being engaged with the lens tube; and
    wherein the restricting member is capable of engaging with the lens tube positioned on the support frame, and thus the lens tube is rotated into the support frame by rotating the fastening member.

2. The assembly tool of claim 1, wherein the fastening member comprises a fastening head, and a first threaded portion formed on the fastening head; the positioning plate defines a connecting hole, and a second threaded portion is formed on the inner surface of the connecting hole; the first threaded portion engages with the second threaded portion.

3. The assembly tool of claim 2, wherein the top cover further comprises a cover body defining an assembly hole, the fastening head extends through the assembly hole of the cover body, and the positioning plate is positioned in the cover body.

4. The assembly tool of claim 2, wherein the fastening head defines a restricting groove in an end thereof for receiving the restricting member.

5. The assembly tool of claim 1, wherein the main body comprises a support member, an assembly plate, and a pivot shaft; the support member comprise a main portion and a pivot portion formed on a side of the main portion; the main portion defines a receiving groove for receiving the assembly plate; the pivot portion is rotatably connected to the top cover via a pivot shaft.

6. The assembly tool of claim 5, wherein the assembly plate defines a restricting hole for receiving the support frame.

7. The assembly tool of claim 6, wherein the support frame defines a positioning hole, a third threaded portion is formed in the inner surface of the positioning hole; and the lens tube forms a fourth threaded portion engaging with the third threaded portion.

8. An assembly tool for assembling a lens module, comprising:
    a main body; and
    a top cover rotatably connected to the main body;
    wherein the top cover comprises a positioning plate and a fastening assembly positioned on the positioning plate; the fastening assembly comprises a fastening member and a restricting member connected to the fastening member, the fastening member are rotatably connected to the positioning plate, the restricting member defines a penetrating hole, and a plurality of engaging portions are formed on a side wall defining the penetrating hole.

9. The assembly tool of claim 8, wherein the fastening member comprises a fastening head, and a first threaded portion is formed on the fastening head; the positioning plate defines a connecting hole, a second threaded portion is formed on the inner surface of the connecting hole; and the first threaded portion engages with the second threaded portion.

10. The assembly tool of claim 9, wherein the top cover further comprises a cover body defining an assembly hole, the fastening head extends through the assembly hole of the cover body, and the positioning plate is positioned in the cover body.

11. The assembly tool of claim 9, wherein the fastening head defines a restricting groove in an end thereof for receiving the restricting member.

12. The assembly tool of claim 8, wherein the main body comprises a support member, an assembly plate, and a pivot shaft; the support member comprise a main portion and a pivot portion formed on a side of the main portion; the main portion defines a receiving groove for receiving the assembly plate; and the pivot portion is rotatably connected to the top cover via a pivot shaft.

13. The assembly tool of claim 12, wherein the assembly plate defines a restricting hole for receiving the lens module.

* * * * *